No. 701,081. Patented May 27, 1902.
H. N. PIERCE.
SPOOL MACHINE.
(Application filed Oct. 1, 1901.)
(No Model.) 10 Sheets—Sheet 10.
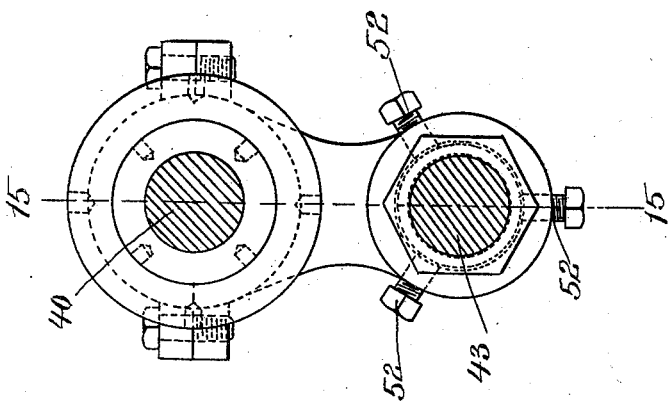
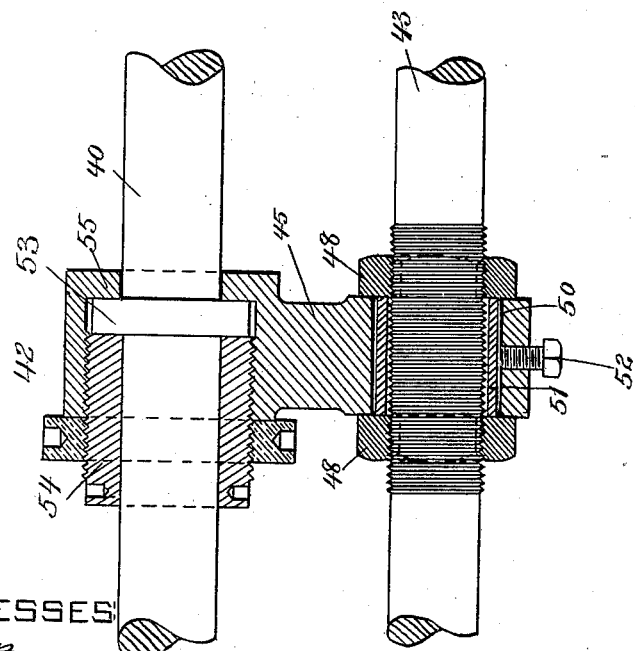
WITNESSES
Horace Brown
O. W. Pezzetti
INVENTOR:
H. N. Pierce
by Macleod Brown & Quinby
attys

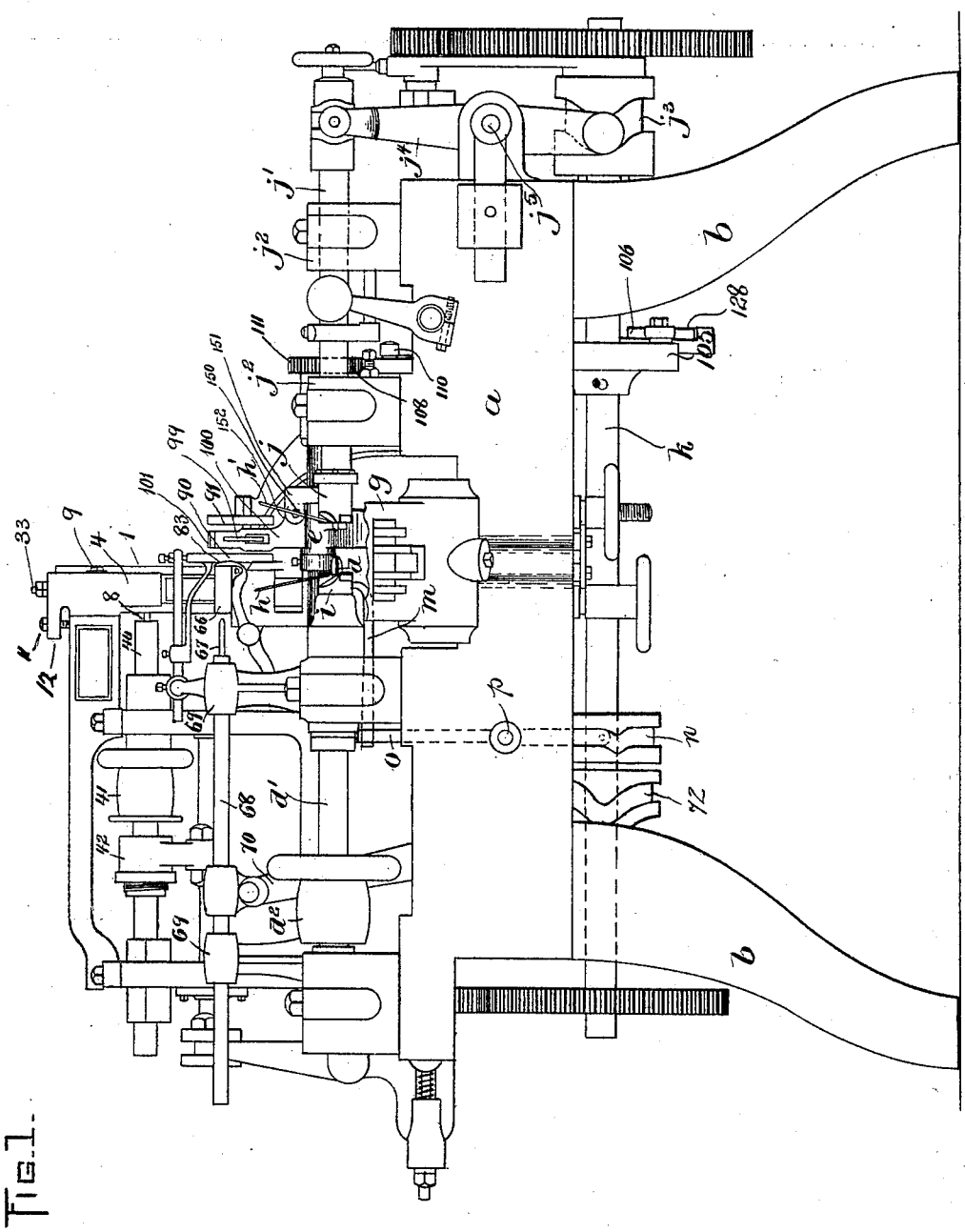

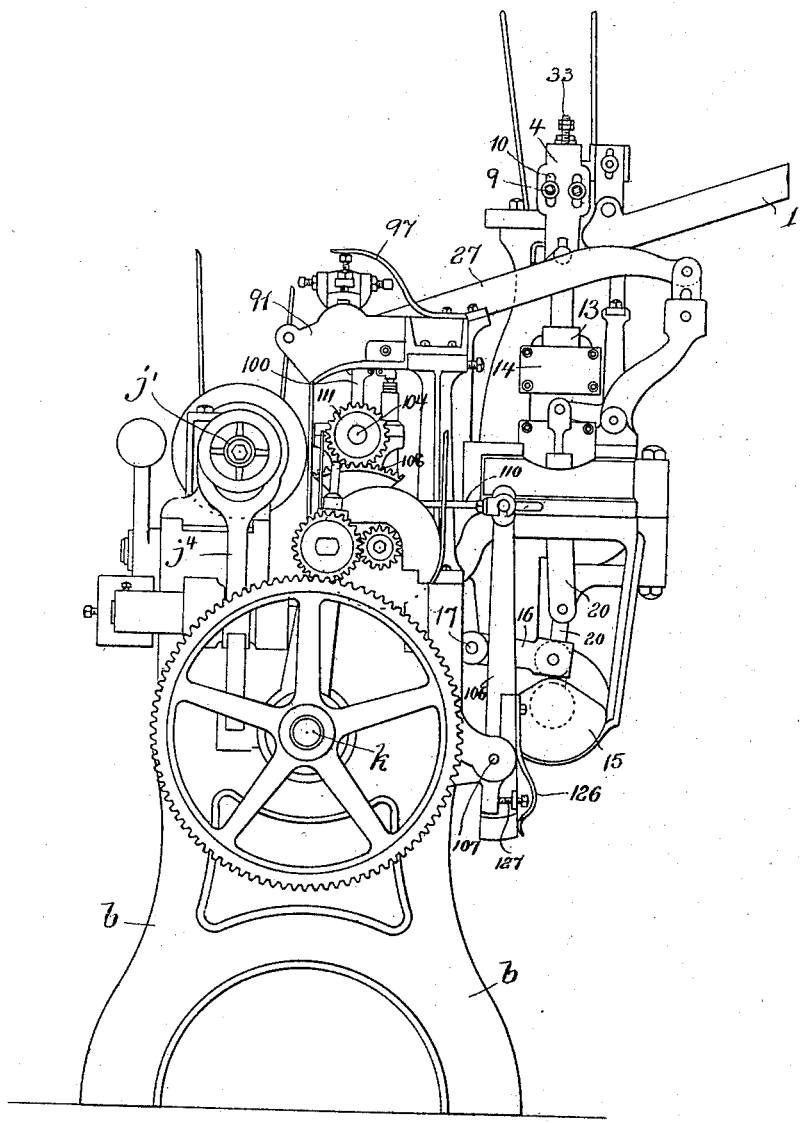

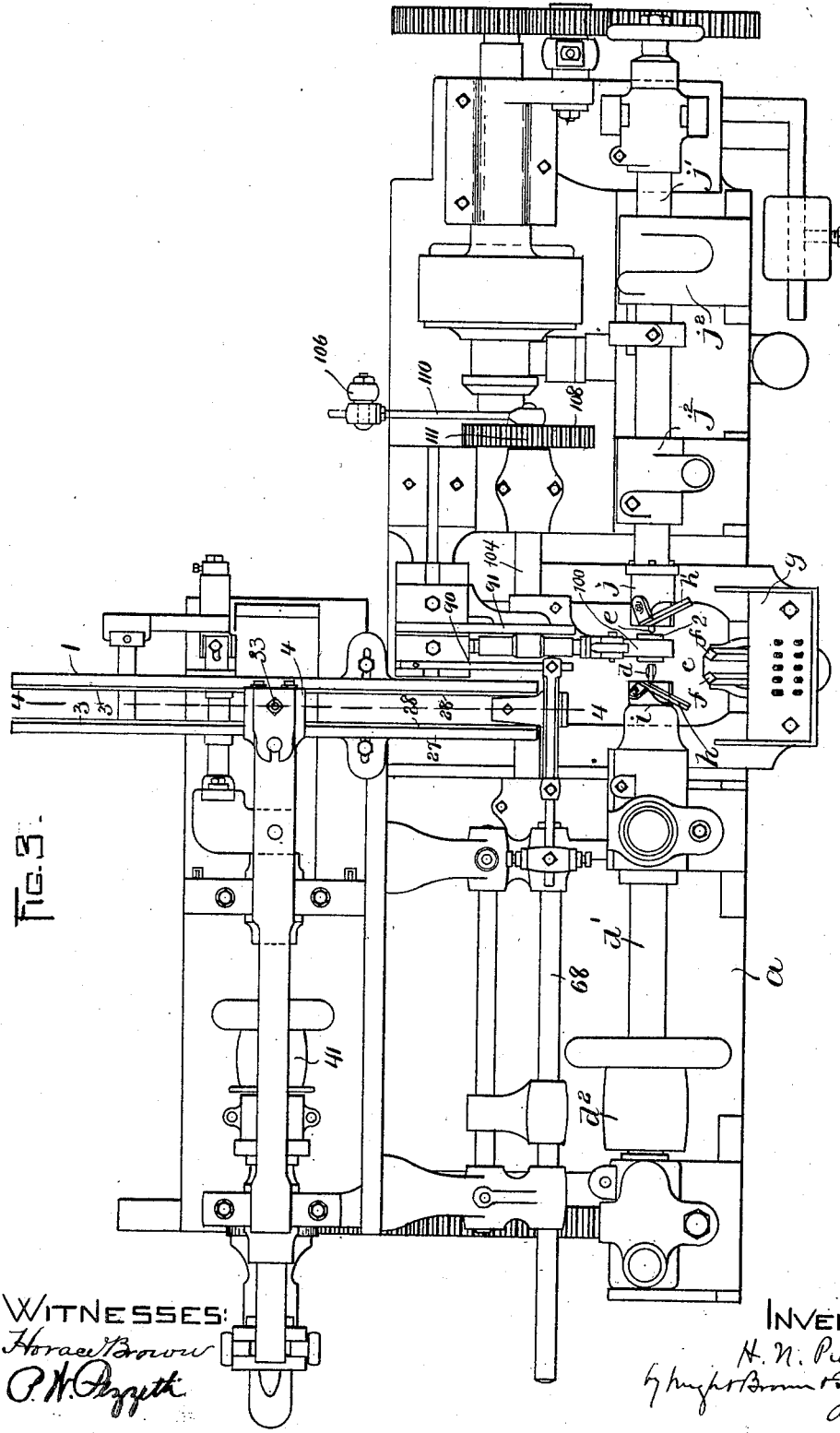

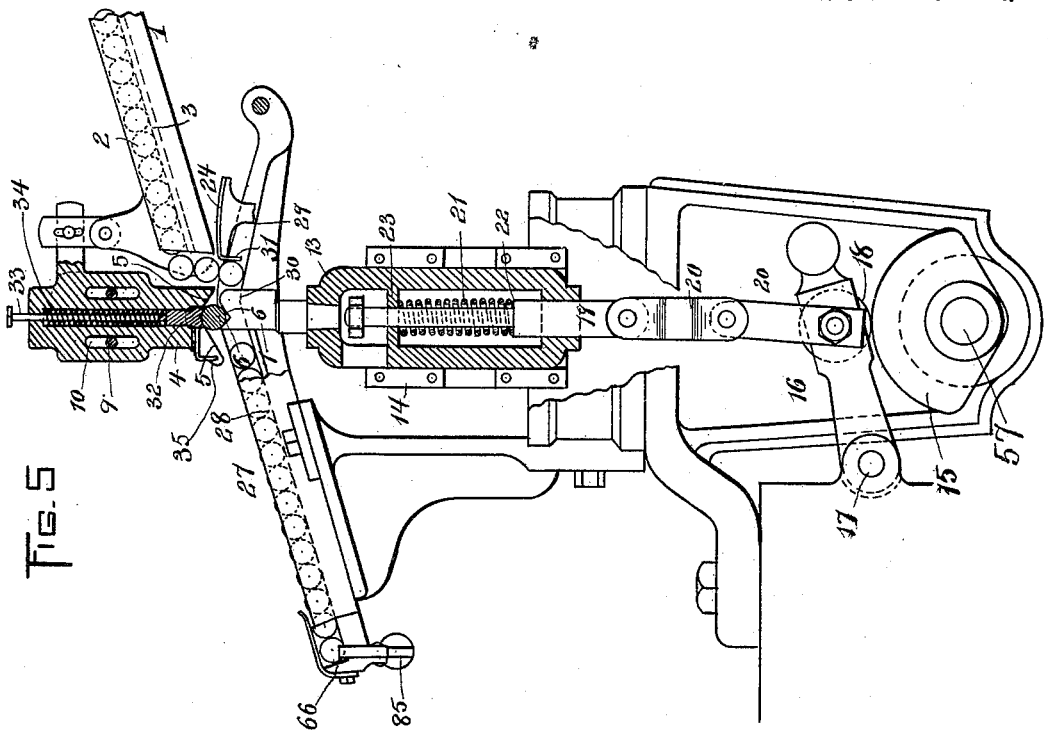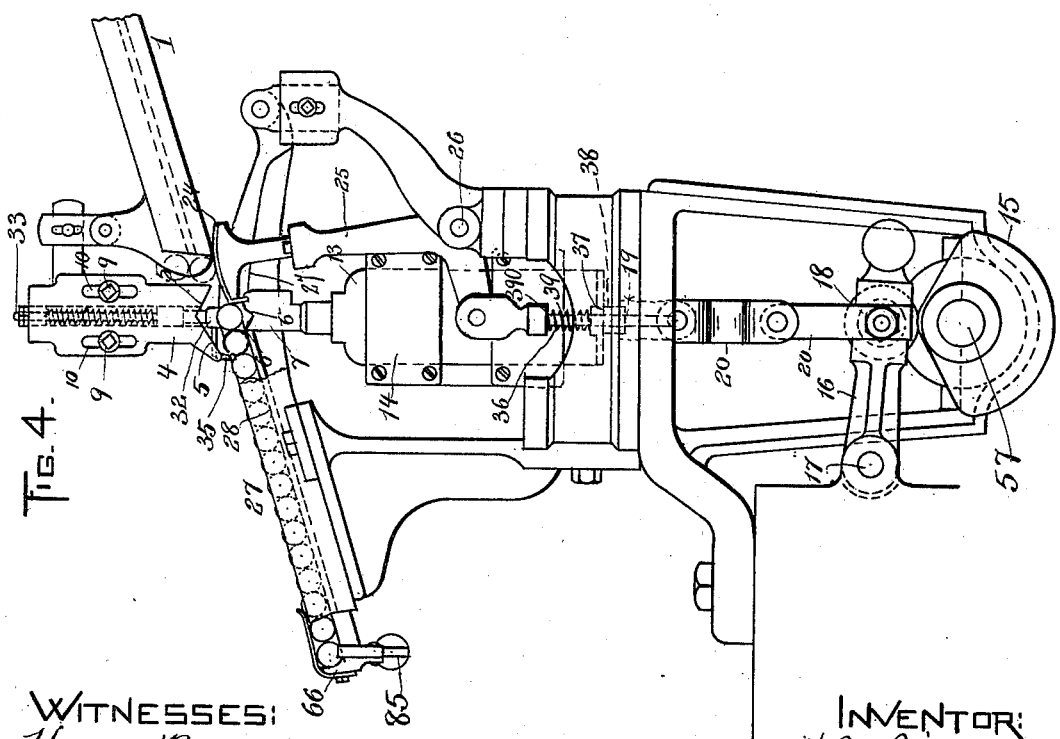

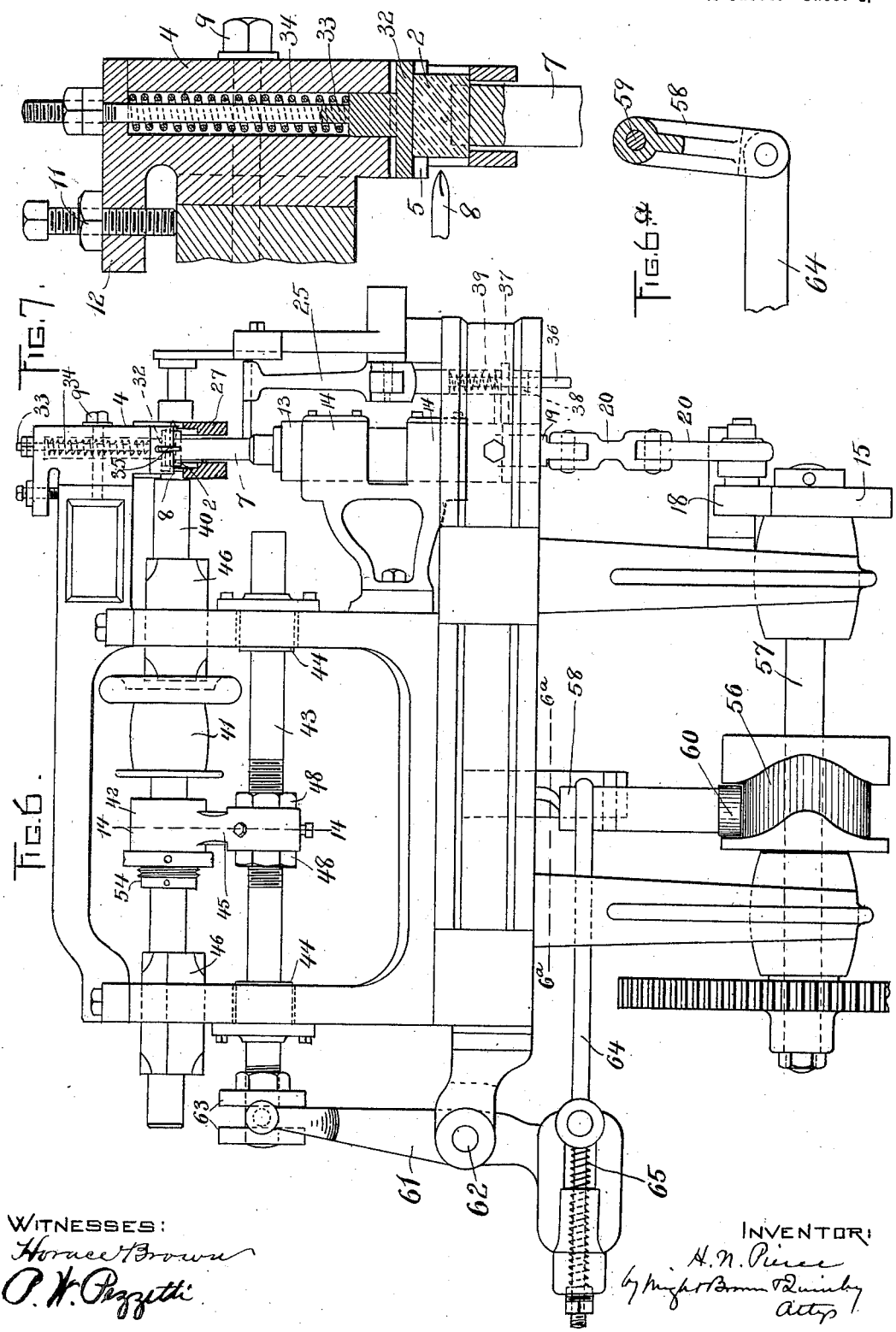

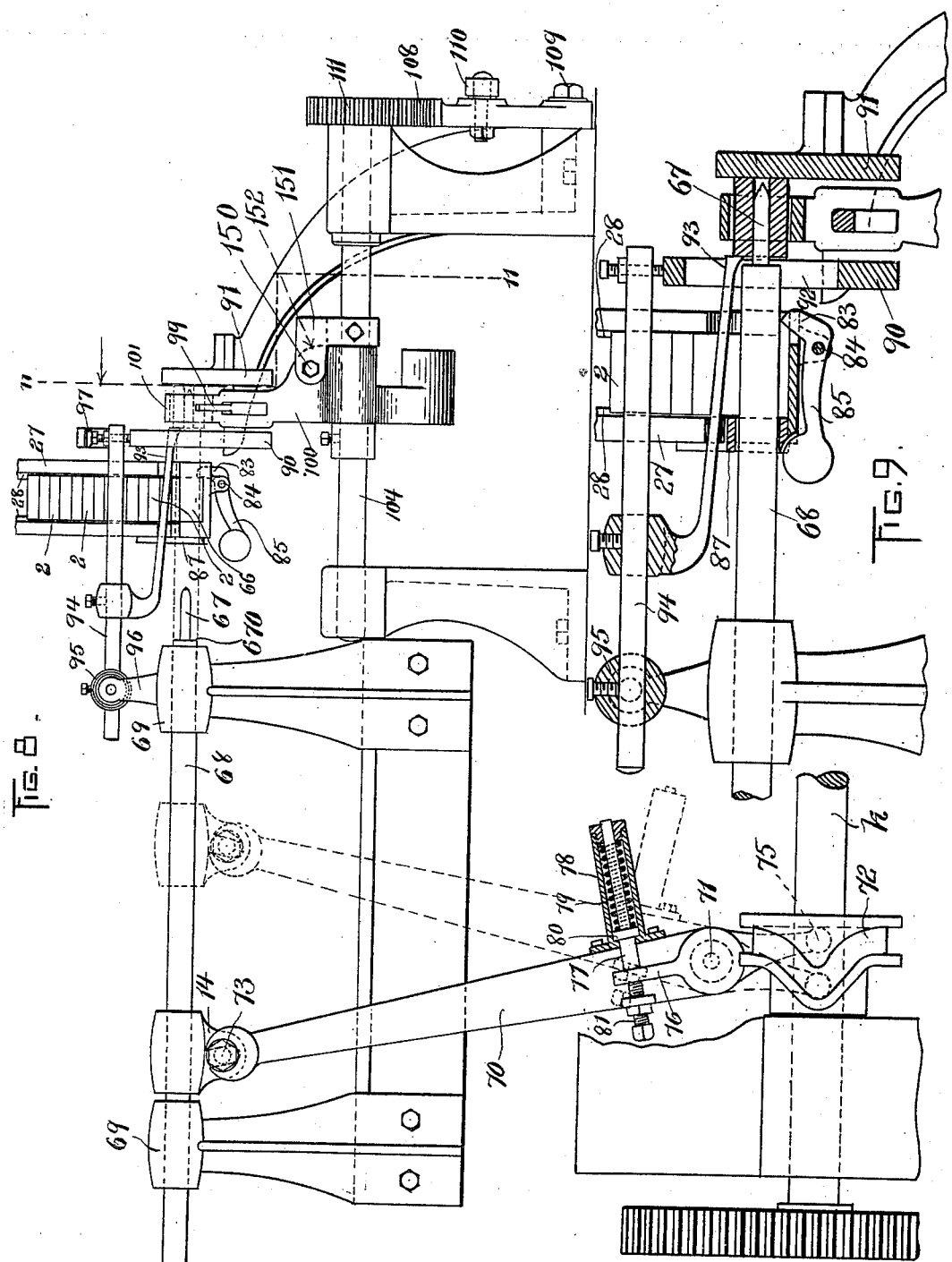

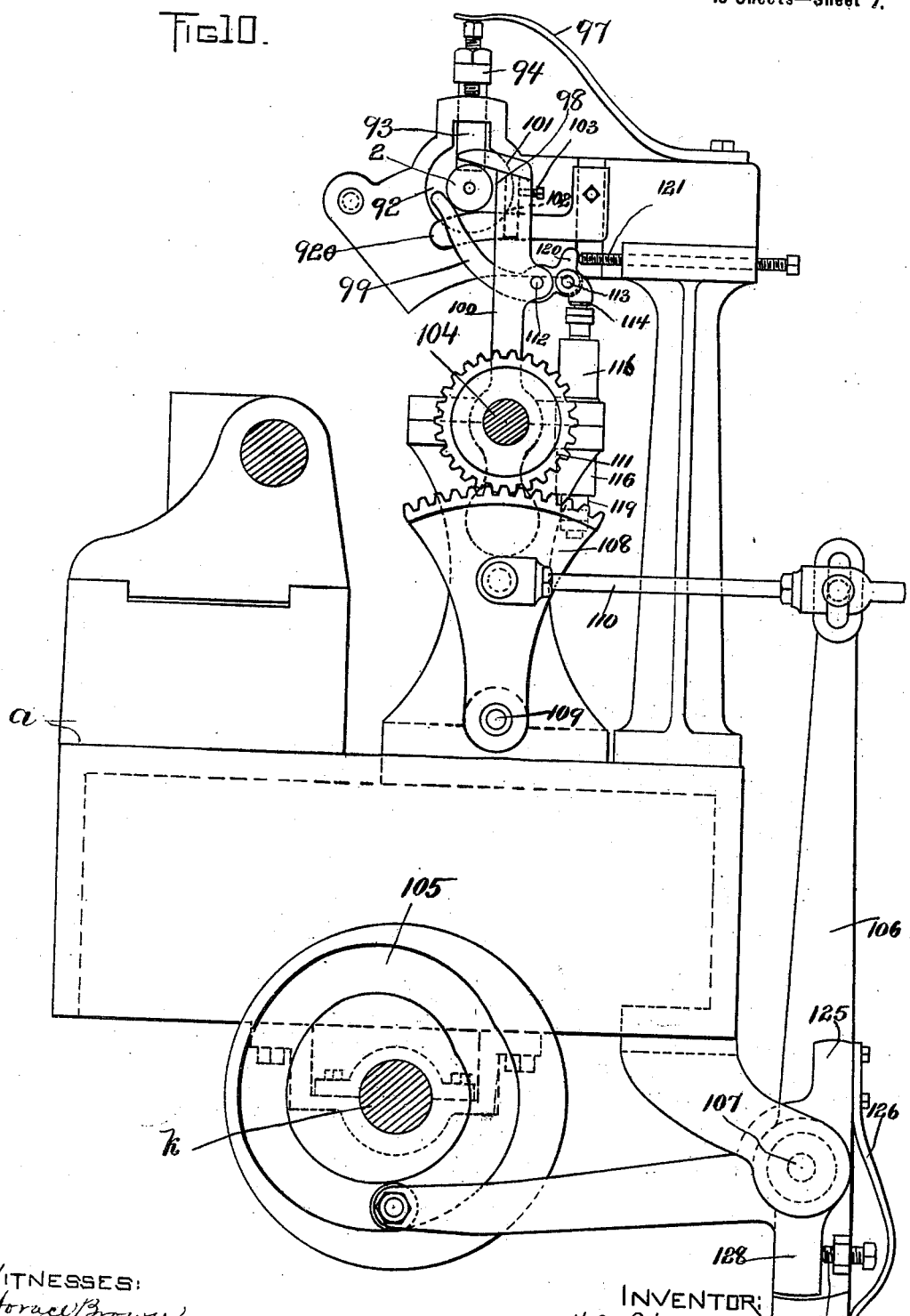

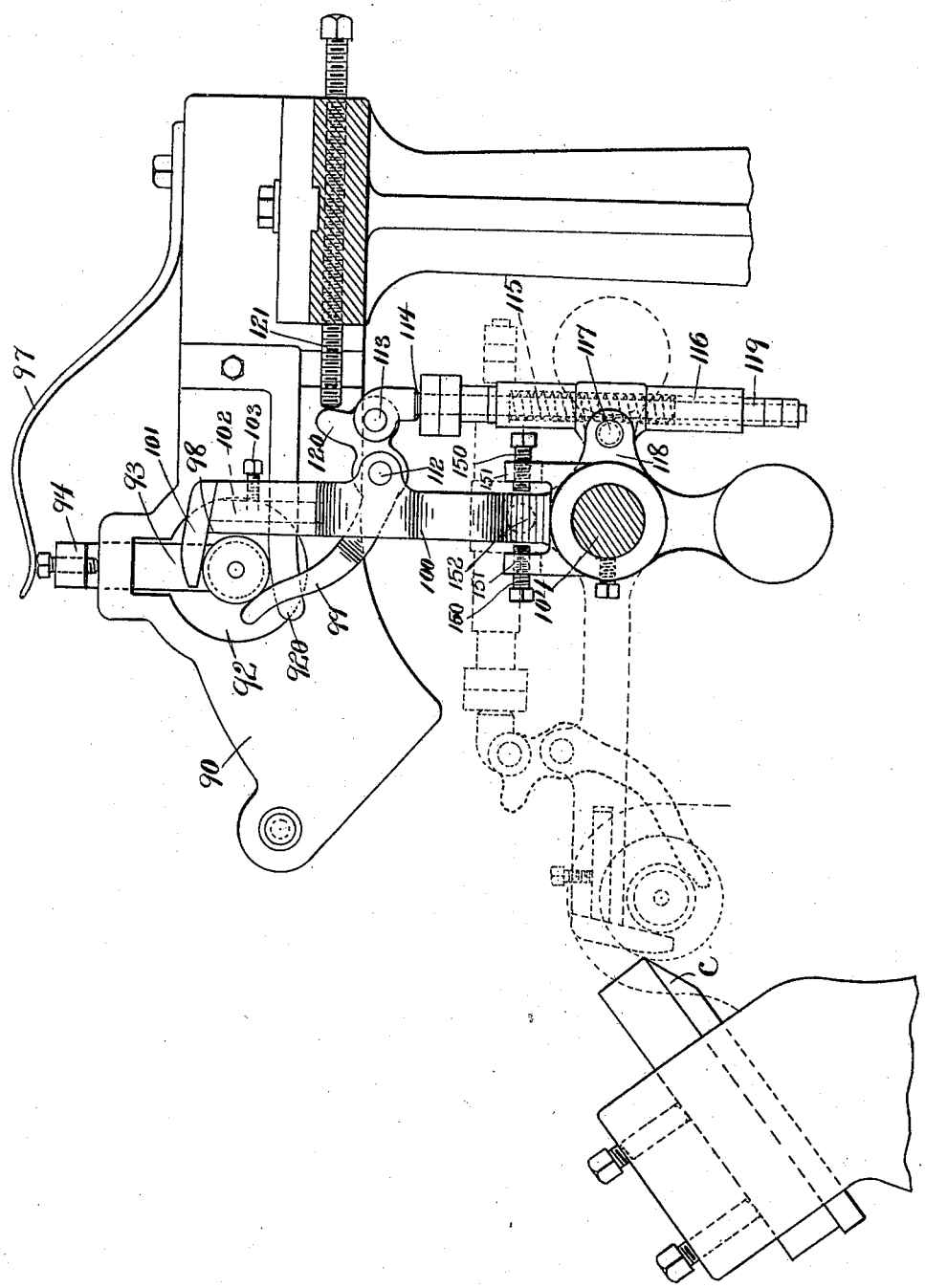

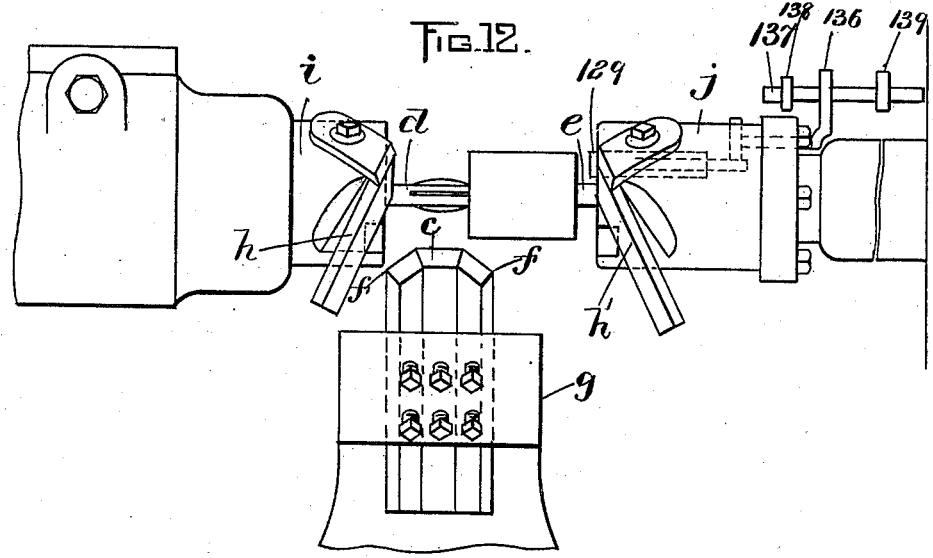
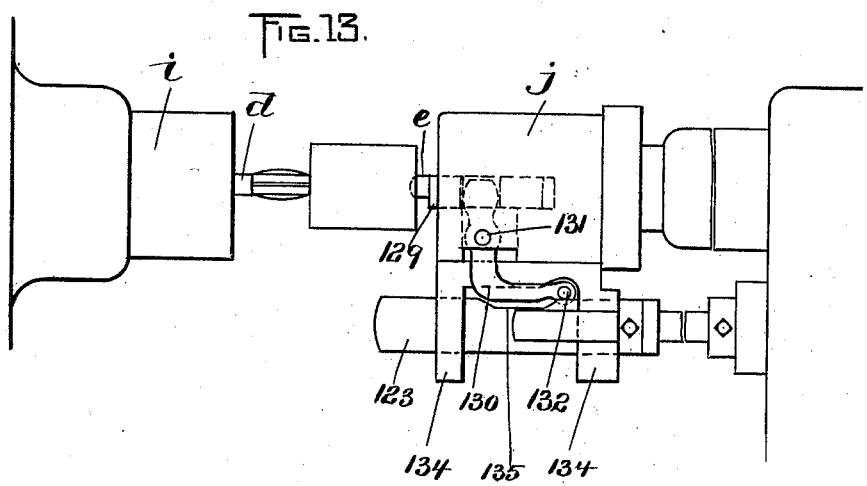

UNITED STATES PATENT OFFICE.

HENRY N. PIERCE, OF LINCOLN, MAINE, ASSIGNOR TO JOHN MacGREGOR, OF LINCOLN, MAINE.

SPOOL-MACHINE.

SPECIFICATION forming part of Letters Patent No. 701,081, dated May 27, 1902.

Application filed October 1, 1901. Serial No. 77,221. (No model.)

*To all whom it may concern:*

Be it known that I, HENRY N. PIERCE, of Lincoln, in the county of Penobscot and State of Maine, have invented certain new and useful Improvements in Spool-Machines, of which the following is a specification.

This invention relates to machines for making wooden spools for thread, &c., from cylindrical blanks, which are supplied to the machine and are converted into spools by the conjoint action of two lathe-centers, which enter the longitudinal bore of the blank and center the same, one of the centers being a live-center having blank-engaging spurs which cause the rotation of the centered blank, body and flange forming cutters which are moved toward the axis of the centered blank while it is being rotated and form the cylindrical body and end flanges of the spool, and end-cutters which trim off the ends of the blank and form the smooth end faces of the spool, one of said end-cutters mounted on a non-rotating head, which moves with the dead-center when the blank is being forced onto the live-center, while the other end-cutter is affixed to an immovable head surrounding the live-center.

The embodiment of the invention here shown includes mechanism for boring the cylindrical blanks and mechanism for transferring the bored blanks to the lathe-centers, so that the blanks are both bored and turned in one organized machine.

The invention may therefore be said to consist as a whole in the improved organization of mechanism hereinafter described and claimed for dogging the cylindrical blanks and holding them for the action of a reciprocating boring-bit, presenting the blanks one at a time to the dogging devices, releasing the bored blanks from the dogging devices, and permitting them to move forward by gravitation a part of the way to the lathe-centers, and positively transferring the blanks, after they reach the end of their gravitating movement, to the lathe-centers.

The invention also consists in the improvements hereinafter described and claimed relating to different parts of said mechanism.
Of the accompanying drawings, forming a part of this specification, Figure 1 represents a front elevation of a spool-machine embodying the invention. Fig. 2 represents an end elevation of the same. Fig. 3 represents a top plan view. Fig. 4 represents a vertical section on line 4 4 of Fig. 3, showing the dogging devices separated. Fig. 5 represents a view similar to Fig. 4, showing the dogging devices closed upon a blank and holding it in position to be bored. Fig. 6 represents a front elevation of portions of the machine, showing particularly the mechanism for operating the boring-bit. Fig. 6ª represents a section on line 6ª 6ª of Fig. 6. Fig. 7 represents a vertical section through the dogging-block and presser-foot, hereinafter referred to. Fig. 8 represents a front elevation showing parts of the machine and intended particularly to illustrate the mechanism for positively transferring the blank. Fig. 9 represents a front elevation, partly in section, similar to a portion of Fig. 8, showing the first step in the operation of transferring the bored blank. Fig. 10 represents an end elevation of the mechanism shown in Fig. 8, certain parts shown in Fig. 8 being omitted and other parts added. Fig. 11 represents a section on line 11 11 of Fig. 8 and an elevation of the parts of the transferring mechanism shown in Fig. 8 at the left of said line. Fig. 12 represents a top plan view showing the spool-forming cutters and the lathe-centers and certain mechanism hereinafter referred to for pushing the bored blank onto the live-center. Fig. 13 represents a front elevation of the parts shown in Fig. 12, the body and flange-forming cutters being removed. Fig. 14 represents a section on line 14 14 of Fig. 6. Fig. 15 represents a section on line 15 15 of Fig. 14.

The same reference characters indicate the same parts in all the figures.

The supporting-frame of the machine is considered to include the bed *a*, legs *b b*, and all the brackets, projections, &c., thereon which support the various parts of the mechanism hereinafter described. The series of spool-forming cutters (shown clearly in Fig. 12) includes the body-forming knife *c*, the cutting edge of which is parallel with the axis of the axis of rotation of the lathe-centers *d e*, and the flange-forming knives *f f*, the cutting edges of which are inclined, said knives being attached to an oscillatory head or holder $g$ and formed to turn the cylindrical surface of the body of the spool and the beveled inner faces of the flanges. The said series of cutters also includes the end-forming knives $h$ $h'$, which form the end faces of the spool. The knife $h$ is affixed to the head $i$, which surrounds the live-center $d$ and is rigid, the live-center rotating within and projecting from it. The knife $h'$ is affixed to the head $j$, which moves endwise with and surrounds the dead-center $e$. The live-center $d$ is affixed to a shaft $d'$, which is rotated by a driving-belt running on a pulley $d^2$, affixed to said shaft. The dead-center $e$ and the head $j$, holding the end-cutter $h'$, are affixed to a slide $j'$, which is movable endwise in fixed guides $j^2 j^2$ on the frame and is reciprocated by means of a cam $j^3$ on the shaft $k$ and a lever $j^4$, fulcrumed at $j^5$ to the frame, the said lever having a trundle-roll at one end engaging the cam $j^3$ and a fork at the other end having studs which enter slots in the slide $j'$. The head $g$, carrying the knives $c f f$, is oscillated by suitable mechanism, which I have not illustrated, this oscillating head and its cutters being common and well known in spool-machines.

It may be here stated that all the parts designated by letters of reference are old and operate in the same manner as in other spool-machines now in common use, the parts which embody my improvements being hereinafter described and designated by numerals.

1 represents the primary raceway, to which the spool-blanks 2 are fed by hand or from a suitable hopper, said raceway being composed of side pieces set edgewise at a distance apart slightly exceeding the length of the blanks and provided on their inner sides with shoulders 3, which constitute tracks on which the blocks roll downwardly, the raceway being suitably inclined.

4 represents a fixed block supported by the frame of the machine at the lower end of the primary raceway. Said block is recessed at its lower end to form inclined jaws 5 5, which coöperate with corresponding inclined jaws 6 6 on a vertically-movable bar 7 in grasping or dogging a spool-blank and holding it for the action of the boring-bit 8. The fixed block 4 may be termed the "dogging-block" or "fixed dogging member" and the movable bar 7 the "dogging-bar" or "movable dogging member." The dogging-block is rendered vertically adjustable by means of horizontal screws 9 9, passing through vertical slots 10 10 in the block and engaged with a portion of the frame, and a vertical bearing-screw 11, Fig. 7, engaged with an arm 12 on the dogging-block and bearing on the frame. The said dogging-bar is affixed to a slide 13, which is movable vertically in fixed guides 14 on the frame, and is raised at regular intervals by means of a cam 15, Figs. 4 and 5, a lever 16, pivoted at 17 to the frame and having a trundle-roll 18 bearing on the cam, a rod 19, movable in guides in the slide 13 and connected by links 20 with the lever 16, and a spring 21, Fig. 5, which is interposed between a shoulder 22 on the rod and an abutment 23 in the slide. Provision is thus made for forcing the dogging-bar upwardly with a yielding movement, so that its jaws bear with a yielding pressure on the spool-blank. The lever 16 and the parts supported by it descend by gravitation when the lever-supporting portion of the cam 15 is descending. The primary raceway is arranged so that its lower end is higher than the lower end of the dogging-block, as shown in Figs. 4 and 5, and is separated from one side of said block by a space of sufficient width to permit a spool-blank to drop between said lower end and the adjacent side of the dogging-block.

24 represents a segmental plate or gate affixed to the upper end of a bell-crank lever 25, fulcrumed at 26 to the frame, and oscillated so that it alternately extends across said space to support a spool-blank above the secondary raceway 27, hereinafter described, and is withdrawn therefrom to permit the blank to drop below the lower end of the dogging-block. The secondary raceway is composed of two side bars formed and arranged like the side bars of the primary raceway, each having at its inner side an inwardly-projecting blank-supporting shoulder or track 28, the blanks rolling down said track by gravitation. The secondary raceway is provided at its upper portion with reversely-inclined extensions 29 of the tracks 28, the apex 30, Fig. 5, formed by the junction of the tracks 28 and their extensions, being at the right of the dogging-bar as viewed in Fig. 5 and at the bottom of the space between the primary raceway and the dogging-block, so that a blank dropping through the said space will fall upon the extensions 29, which are so inclined as to give the blanks a tendency to roll away from the dogging-block or toward the right as viewed in Fig. 5. The gate 24 is provided at one end with a feeding device 31, here shown as a downwardly-projecting finger, which stands behind the blank that falls through said space, the inclination of the track extensions 29 holding the blank against said finger, so that when the gate 24 moves forward toward the dogging-block it forces the blank forward between the jaws of the dogging-bar, which is now depressed, as shown in Fig. 4. The dogging-bar now rises and forces the blank upwardly against the jaws of the dogging-block, as shown in Fig. 5, the blank being thus firmly held in position to be bored by the boring-bit 8, as hereinafter described. While the blank is being bored the gate moves backwardly far enough to permit another blank to drop in front of the finger 31.

The dogging-block is recessed to receive a presser-foot 32, Figs. 4, 5, and 7, which is affixed to a vertical presser rod or bar 33, extending upwardly through the dogging-block and pressed yieldingly downward by a spring 34. To said presser-foot is affixed a hooked finger or detent 35, which projects through a slot in one side of the dogging-block and serves to temporarily arrest the blank after it has been bored and released from between the dogging-jaws, said blank being thus held in position to act as a stop for the last blank introduced between the dogging-jaws. When the dogging-bar rises, it presses the unbored blank against the presser-foot, the latter yielding to the blank and at the same time holding the under side of the blank firmly against the jaws of the dogging-bar, thus preventing any tendency of the blank to lie askew on said jaws. This upward motion of the presser-foot raises the detent 35 and releases the blank previously bored, which rolls down the inclined tracks 28 of the secondary raceway. After the boring operation the dogging-bar descends and the presser-foot and detent follow the downward movement of the dogging-bar, the presser-foot preventing any tendency of the bored blank to stick between the jaws of the dogging-block, and at the same time the detent 35 returns to position to arrest the bored blank and cause it to act as a stop for the blank next moved forward by the finger 31.

The bell-crank lever 25, carrying the plate 24 and its finger 31, is connected by a rod 36 with an ear 37 on the slide 13, the rod passing through the ear and having a nut 38 bearing on the lower side of the ear. A spring 39, interposed between the ear 37 and a shoulder 390 on the rod 36, holds the nut 38 yieldingly against the ear and causes the rod to move with the slide 13, thus oscillating the lever 25, the spring permitting the backward movement of the lever to be arrested by a suitable stop before the completion of the upward movement of the dogging-bar.

The boring-bit 8 is affixed to a spindle 40, which is rotated by a driving-belt running on a pulley 41 and journaled in a thrust-bearing 42, supported by a horizontally-movable carriage and in fixed bearings 46 on the frame. The said carriage is composed of a cylindrical slide 43, movable in fixed guides 44 on the frame, and an arm 45, affixed to said slide, the thrust-bearing 42 being formed on said arm. The arm 45 is affixed to the slide 43 by means of clamping-nuts 48, engaged with the threaded periphery of the slide, said nuts bearing on opposite sides of the arm 45. The hub portion of the arm has an enlarged orifice 50, Fig. 15, which receives a bushing 51, surrounding the slide between the nuts, the diameter of the orifice 50 being greater than that of the bushing. The arm is adjustably supported on the bushing by bearing-screws 52, inserted in the hub portion of the arm and bearing on the periphery of the bushing. The arm is therefore adjustable lengthwise of the slide to effect an endwise adjustment of the bit. The bit-spindle has a collar 53 within the thrust-bearing, the latter having an adjustable gland 54, which bears on one side of the collar, and a flange 55, which bears on the opposite side of the collar. Loose endwise movement or end thrust of the bit-spindle is thus prevented.

The bit-spindle is reciprocated endwise to cause the bit to enter and recede from a blank held by the dogging-jaws by means of a cam-groove 56, Fig. 6, in a disk affixed to a shaft 57, a lever 58, fulcrumed at 59 and having a trundle-roll 60 engaged with said cam-groove, a lever 61, fulcrumed at 62 and having a forked upper arm engaged with collars 63 on the slide 43, and a link 64, connecting the lower arm of the lever 61 with the lever 58. The connection between the link 64 and lever 61 is made yielding by means of a spring 65, so that the bit is permitted to yield in case it encounters an unusual resistance, such as would be caused by the failure of the spool-blank to be held by the dogging-jaws, the blank being permitted to rotate with the bit after the latter has partially entered the blank. This result might be caused by an unusually hard knot in the blank, and damage to the bit and its operating mechanism from such cause is prevented by the described yielding connection.

At the lower end of the secondary raceway 27 is a fixed stop 66, which arrests the lowest blank therein and holds it with its orifice in alinement with a transferring-pin 67, surrounded by a shoulder 670, whereby the blank is moved endwise out of the secondary raceway into the path of an oscillating carrier-arm 100, hereinafter described, which completes the transference of the blank to the lathe-centers $d$ and $e$, the pin 67 entering the bore of the blank and supporting it for said carrier after the blank has been moved out of the secondary raceway. The said transferring-pin 67 is formed to enter the bored orifice in the blank and is affixed to a cylindrical slide or rod 68, which is movable endwise in fixed guides 69, the outer end of said rod forming the shoulder 670. The said rod is reciprocated by means of a lever 70, Fig. 8, fulcrumed at 71, and a groove-cam 72, affixed to the shaft $k$, one arm of said lever having a slot which receives a stud 73 on an ear 74, affixed to the rod 68, while the other arm has a trundle-roll 75 engaged with the cam 72. The two arms of the lever 70 are made in separate parts jointed together at the fulcrum 71. The lower arm has a rib 76, against which bears a stud 77, which is movable in a casing 78, affixed to the upper arm. A spring 79 in said casing bears against a shoulder 80 on the stud and holds the stud yieldingly against the rib 76. A bearing-screw 81 on the upper arm of the lever bears against the opposite side of the rib. This construction permits the said upper arm to yield if in moving the transferring-pin forward into a blank the pin does not enter the orifice in the blank but strikes the end of the latter.

One side of the raceway has an opening in which is located a tubular piece 87, whose internal diameter is less than that of a spool-blank, so that it forms a stop to prevent the endwise displacement of the lowest blank, the said tubular piece being in alinement with the pin-carrying slide 68 and of sufficient internal diameter to receive said slide, so that the slide enters the tubular projection or stop and pushes the lowest blank away from it. The opposite side of the raceway is cut away to form an opening or blank-outlet 82, through which the blank is moved endwise by the shoulder 670. The blank is prevented from moving while the pin is entering it by a weighted dog 83, Fig. 8, pivoted at 84 to the bottom of the raceway 27. Said dog is normally held by its weighted arm 85 in position to form an end-stop for the blank while the pin is entering it. When the shoulder 670 strikes the blank, the dog 83 yields, as shown in Fig. 9, and the blank is moved endwise into a space between two plates 90 91. The plate 90 has an opening 92, Fig. 11, through which the blank passes, while the plate 91 is solid opposite said opening and forms a stop for the advancing end of the spool. On the inner sides of the plates 90 91 are formed shoulders 920, arranged to bear on the under side of the spool-blank. The plate 91 constitutes a gage or stop for the spool-blank and is so located relatively to the live-center $d$ that when the blank is moved sidewise and downwardly by the oscillating carrier next described its end which is to be penetrated by the live-center will not strike the outer end of the live-center. When the forward end of the blank is arrested by the stop-plate 91, its rear end is engaged by a spring detent-arm 93, which is arranged to be displaced by the blank while the latter is being transferred and to spring downwardly into engagement with the inner end of the blank when the latter has been completely transferred, as shown in Fig. 9. Said detent-arm is attached to a rod 94, which in turn is attached at one end to a hub 95, journaled in fixed bearings 96, the hub permitting the rod 94 and detent-arm 93 to rise and fall. A spring 97, Fig. 11, bearing on the free end of the rod 94, yieldingly depresses the detent-arm.

Before the transferring-pin withdraws, the transferred blank is grasped between the angular jaw 98 and the spring-jaw 99 of an oscillating carrier-arm 100. (See Fig. 11.) After the withdrawal of the pin said jaws carry the blank forward and downward to a point between the lathe-centers $d$ and $e$, while the dead-center is retracted and holds it until the dead-center is projected and forces the blank endwise into engagement with the live-center. The jaw 98 is formed by a portion of one side of the arm 100 and by a headpiece 101, adjustably affixed to the outer end of said arm by a shank 102 and a set-screw 103. The arm 100 is mounted on a rock-shaft 104, journaled in bearings on the frame. Said shaft is oscillated to alternately hold the jaws in the positions shown by full and dotted lines in Fig. 11 by the mechanism shown in Fig. 10, and comprising a cam 105 on the shaft $k$, a bell-crank lever 106, fulcrumed at 107, one arm of said lever having a trundle-roll engaged with the cam 105, a rack-segment 108, pivoted at 109 to the frame, a link 110, connecting the said segment with the other arm of the bell-crank lever, and a gear 111, affixed to the rock-shaft 104 and meshing with the segment 108.

The spring-jaw 99 is the longer arm of a lever, which is fulcrumed at 112 on the arm 100, its shorter arm being pivoted at 113 to a rod 114, which is pressed by a spring 115 in the direction required to swing the jaw 99 toward the jaw 98, and thus cause the two jaws to grasp the transferred blank, the spring-jaw 99 forcing the blank against the two faces of the jaw 98. The rod 114 and spring 115 are contained in a casing 116, which is pivoted at 117 to ears 118 on the hub portion of the carrier-arm 100. The rod is adapted to slide in the casing 116, and the spring is interposed between one end of the casing and a nut 119 on the rod. The shorter arm of the lever forming the jaw 99 is provided with a projection 120, which is arranged to strike an adjustable stop-screw 121 when the carrier is moved a little to the right of the full-line position, (shown in Fig. 11,) the jaw 99 being thus held open or forced outwardly from the jaw 98 sufficiently to allow the two jaws to embrace the spool-blank when the carrier moves forward, the jaw 99 being thus held open until the jaws have been moved forward sufficiently to embrace the blank. The cam 105 is formed to give the carrier-arm a slight forward movement sufficient to engage the jaws 98 99 with the blank and then arrest the carrier-arm before the transferring-pin leaves the blank, after which the carrier-arm is moved with the blank between its jaws to the position shown by dotted lines in Fig. 11.

Provision is made for giving the upper arm of the bell-crank lever 106, Fig. 10, a yielding movement, so that the carrier-arm 100 and its jaws can yield if they encounter an obstruction. The arms of the lever are in two parts, the lower arm having an ear 125, to which is affixed a spring 126, bearing on the lower end of the upper arm and exerting pressure on the upper arm in such direction as to press a bearing-screw 127 on the upper arm against an ear 128 on the lower arm. Provision is also made for giving the carrier-arm 100 a slight independent or wabbling movement on the rock-shaft 104, so that if the bore of the spool-blank held by the jaws between the lathe-centers happens to be slightly out of exact alinement with said centers the jaws will move or yield sufficiently to make the alinement exact. To this end the hub portion of the carrier-arm is mounted loosely on the rock-shaft, so that it can turn thereon, its turning movement being limited by stop-screws 150 in ears 151, affixed to the rock-shaft. Said screws stand at opposite sides of a web or projection 152 on the carrier-arm, as shown in Fig. 11, the width of said projection being such that it can oscillate slightly between the stop-screws. The blank is now introduced between the two centers $d$ and $e$, the dead-center being at this time retracted to afford room between the centers for the blank.

It will be seen by reference to Fig. 11 that the blank-grasping jaws at the outer end of the carrier-arm 100 are moved by the oscillating of said arm in a segmental path which is arranged to give the jaws a substantially vertical movement, causing the jaws to move downwardly between the lathe-centers in a direction substantially at right angles to the substantially horizontal path in which the turning-knives move in approaching the lathe-centers. This vertical movement of the jaws during the latter part of their blank-presenting movement gives my machine an important advantage over machines in which the forward movement of the jaws is approximately horizontal or toward the turning-knives, because it not infrequently happens that a spool which has been turned fails to be dislodged from the lathe-centers, but remains between them when the carrier is approaching with another blank. When this happens, the spool is dislodged or moved from between the lathe-centers by the jaws, and if said jaws move toward the knives, as heretofore, the spool is forced by them directly against the knives, causing damage to the knives and other parts. The downward movement of the jaws obviates this difficulty, the spool being forced downwardly by the jaws without possibility of contact with the knives.

In the body of the movable head $j$, which surrounds the dead-spindle, is located a blank-pusher, which is a stud or bolt 129, (Figs. 12 and 13,) movable longitudinally in the head $j$. One end of said pusher is projected beyond the outer face of the head while the head and dead-spindle are being moved forward, the pusher bearing against the blank and forcing it onto the live-spindle until the advancing end of the block reaches the knife of the fixed head $i$, after which the pusher is released and yields to the pressure of the blank against it. The object of the pusher is to prevent the rear end of the blank from coming in contact with the knife of the movable head $j$ before the forward end of the block encounters the knife of the fixed head $i$. If the knife of the movable head were allowed to act on the blank during the entire endwise movement of the blank, an unnecessary amount of material would be removed from the end of the blank by the said knife. The pusher prevents this waste by preventing the knife of the movable head from operating until the knife of the fixed head commences to operate. I thus save about one-sixteenth of an inch on each spool.

The pusher is locked and released by the following devices: 130 represents a bell-crank lever pivoted at 131 to the head $j$. One arm of said lever is engaged with a slot in the pusher and its other arm has a stud or pin 132, which rests on the upper edge of a slide 133. Said slide is mounted loosely in guides 134 on the head $j$ and has a depression 135 in its upper edge. One end of the slide 133 is bent outwardly to form an ear 136, which has a hole into which extends a fixed rod 137, having stop-collars 138 139 at opposite sides of the ear. Said collars are so arranged that when the head $j$ and the dead-center are nearly at the end of their forward movement the collar 138 will arrest the movement of the slide, thus causing the bell-crank lever to drop into the recess 135 and release the pusher. When the head $j$ and center $e$ are moving backwardly, the stop-nut 139 strikes the ear 136 and again arrests the slide, causing the lever 130 to leave the recess 135 and bear on the raised portion of the slide. The pusher is locked in its projected or pushing position when the lever bears on the raised portion of the slide and is released when the lever drops into the recess.

After the blank has been placed between the centers $d$ $e$ by the carrier the dead-center is moved forward toward the live-center and forces the blank endwise onto the live-center, the spurs of the latter engaging the blank and rotating the same.

After the spool has been forced onto the live-center the carrier-arm 100 is swung upwardly away from the blank, the spring-jaw 99 yielding and slipping off from the blank. The cutter-carrier $g$ now advances and presents the body and flange forming cutters to the rotating blank, after which the carrier $g$ retreats, and the completed spool is knocked off from the live-spindle by an ejector $m$, Fig. 1, operated by a cam $n$ on the shaft $k$, and a lever $o$, fulcrumed at $p$ to the frame and engaged, as shown, with the cam and ejector.

It will be observed that the lathe-centers $d$ and $e$ are offset from the secondary raceway or, in other words, are at opposite sides of the path of the carrier-jaws, which path is at one side of or offset from the said raceway.

I claim—

1. In a spool-machine, the combination of blank-boring mechanism including means for grasping and releasing the blanks, and means for perforating the grasped blanks, mechanism for feeding the blanks singly to the boring mechanism, an inclined raceway arranged to receive the bored blanks from the boring mechanism and conduct them by gravitation to a lower point, lathe-centers offset from the raceway, means for transferring the blanks endwise from the lower end of the raceway to a point outside the raceway, and means for transferring the blanks sidewise from said point to a point between the lathe-centers.

2. In a spool-machine, the combination of a boring mechanism comprising a fixed dogging member, an inclined raceway having its higher end located below the said fixed member, a vertically-movable dogging member arranged to rise above said higher end in dogging a blank, a detent yieldingly held in position to arrest a bored blank in the upper portion of the raceway and adapted to be raised with the movable dogging member to release said bored blank, a reciprocating bit movable between the dogging members, and mechanism for feeding blanks between the dogging members when the movable member is depressed, each blank fed between said members displacing the blank last bored and causing it to be engaged by said detent until the displacement of the detent caused by the upward movement of the movable dogging member.

3. In a spool-machine, the combination of a fixed upper dogging member internally recessed to form a presser-foot guide, a movable lower dogging member, each member being recessed to form jaws, mechanism for reciprocating said movable member, a yielding presser-foot movable in said guide and adapted to bear yieldingly on a blank inserted between the two members and press the same against the jaws of the lower dogging member, and a reciprocating boring-bit movable between the two members.

4. In a spool-machine, the combination of a fixed upper dogging member, a movable lower dogging member, mechanism for reciprocating said movable member, a yielding presser-foot connected with the fixed member and adapted to bear yieldingly on a blank inserted between the two members, a detent affixed to said presser-foot, and a reciprocating boring-bit movable between the two members.

5. In a spool-machine, the combination of a fixed upper dogging member, an inclined primary raceway having its lower end located above the lower end of the fixed member and separated from the latter by a vertical space adapted to receive a blank, a secondary inclined raceway having its higher end located below the said fixed member, a vertically-movable dogging member arranged to rise above said higher end in dogging a blank, a reciprocating bit movable between the dogging members, a reciprocating gate adapted to alternately open and close the space between the primary raceway and the fixed dogging member, a blank-feeding device movable with the said gate and adapted to force a dropped blank forward between the dogging members when the movable member is depressed, and inclined tracks at the bottom of said space, adapted to hold the dropped blank against said feeding device by gravitation.

6. In a spool-machine, the combination of a fixed upper dogging member, an inclined primary raceway having its lower end located above the lower end of the fixed member and separated from the latter by a vertical space adapted to receive a blank, a secondary inclined raceway having its higher end located below the said fixed member, a vertically-movable dogging member arranged to rise above said higher end in dogging a blank, a reciprocating bit movable between the dogging members, a reciprocating gate adapted to alternately open and close the space between the primary raceway and the fixed dogging member, a blank-feeding device movable with the said gate and adapted to force a dropped blank forward between the dogging members when the movable member is depressed, means for raising and depressing the movable dogging member, a pivoted lever carrying said gate and feeding device, and connections between the said movable dogging member and lever, whereby the gate and feeding device are moved forward to close said space and feed a blank during the depression of the movable dogging member and are moved backward to open said space during the ascent of the movable dogging member.

7. In a spool-machine, the combination of an inclined raceway having a fixed blank-arresting stop at its lower end, means for transferring the lowest blank endwise to a point outside the raceway, lathe-centers offset from the raceway, and means for transferring the said blank sidewise to a point between the lathe-centers.

8. In a spool-machine, the combination of an inclined raceway having a fixed blank-arresting stop at its lower end, a reciprocating slide having a pin and a pushing-shoulder movable across the raceway to transfer the lowest blank endwise to a point outside the raceway, lathe-centers offset from the raceway, and means for transferring the blank sidewise to a point between said lathe-centers.

9. In a spool-machine, the combination of an inclined raceway having a fixed blank-arresting stop at its lower end, means for transferring the lowest blank endwise to a point outside the raceway, lathe-centers offset from the raceway, an oscillating carrier having jaws adapted to grasp the blank at the end of its endwise movement, and to transfer the blank to a point between the lathe-centers.

10. In a spool-machine, the combination of an inclined raceway having a fixed blank-arresting stop at its lower end, means for transferring the lowest blank endwise to a point outside the raceway, a fixed stop or abutment arranged to limit the endwise movement of the blank, lathe-centers offset from the raceway, and means for transferring the blank sidewise to a point between said centers.

11. In a spool-machine, the combination of an inclined raceway adapted to receive spool-blanks and having a fixed blank-arresting stop at its lower end, and openings in the lower portions of its sides, a reciprocating transferring device movable through said openings across the raceway to move the lowest blank endwise out of the raceway, said device comprising a pin and a pushing-shoulder behind the pin, and means outside the raceway for grasping the blank at the end of its endwise movement.

12. In a spool-machine, the combination of an inclined raceway adapted to receive spool-blanks and having a fixed blank-arresting stop at its lower end and openings in the lower portions of its sides, a transferring device movable through said openings to give the lowest blank an endwise movement out of the raceway, said device comprising a pin and a pushing-shoulder behind the pin, a fixed stop or abutment outside the raceway to limit the endwise movement of the blank, means for reciprocating said transferring device, said means having provisions for giving the transferring device a yielding forward movement, lathe-centers offset from the raceway, and means for transferring the blank sidewise to a point between the lathe-centers.

13. In a spool-machine, the combination of an inclined raceway adapted to receive spool-blanks and having a fixed blank-arresting stop at its lower end and openings in the lower portions of its sides, a reciprocating transferring device movable through said openings across the raceway to give the lowest blank an endwise movement out of the raceway, said device comprising a pin and a pushing-shoulder behind the pin, a yielding stop adapted to arrest the blank while the pin is entering its orifice and adapted to yield to the movement imparted to the blank by said shoulder, means for grasping and holding the blank at a point outside the raceway, and a detent adapted to engage the blank after it reaches the end of its endwise movement and prevent it from being moved backwardly by the transferring device.

14. In a spool-machine, the combination of an inclined raceway having a fixed blank-arresting stop at its lower end and a blank-outlet in the lower portion of one of its sides, means for transferring the lowest blank endwise through said outlet, lathe-centers offset from the raceway, an oscillatory carrier having jaws adapted to grasp a spool-blank projecting from said outlet, the path of said carrier extending between the lathe-centers, and the guard or guide-plates 90 and 91 located at opposite sides of said path and having shoulders or tracks 92 arranged to bear on the under side of the transferred blank, one of said plates having a blank-receiving opening in alinement with the blank-outlet of the raceway, while the other plate presents a solid blank stop or abutment opposite said opening.

15. In a spool-machine, the combination of a head or holder equipped with suitable turning-knives movable in a substantially horizontal path, lathe-centers adapted to hold a spool in the path of said knives and to rotate said spool, and an oscillatory carrier-arm having blank-grasping jaws at its outer end, said jaws being movable by the oscillatory movements of the carrier-arm in a segmental path which is arranged to give the jaws a substantially vertical movement when they are approaching the lathe-centers, so that a spool which may have adhered to said centers after the turning operation is forced downwardly by the jaws away from the turning-knives.

16. The combination with the lathe-centers $d$ and $e$, and the heads $i$ and $j$, provided respectively with the knives $h$ and $h'$, of a pusher independently movable in the movable head $j$ and adapted to project from the end thereof, and means for alternately locking and releasing said pusher, said means comprising a lever pivoted to said head $j$ and having an arm projecting therefrom, a slide movable in guides carried by the head $j$ and provided with a recessed upper edge on which said arm bears, and fixed stops arranged to limit the movements of said slide.

In testimony whereof I have affixed my signature in presence of two witnesses.

HENRY N. PIERCE.

Witnesses:
J. FRED CLARK,
CHAS. F. PLUMLY.